US007265771B2

(12) United States Patent
Huang

(10) Patent No.: US 7,265,771 B2
(45) Date of Patent: Sep. 4, 2007

(54) PRINTER CAPABLE OF DETECTING STATUS OF UNUTILIZED RIBBON

(75) Inventor: Kuang-Huei Huang, Taipei (TW)

(73) Assignee: Hi-Touch Imaging Technologies Co., Ltd., Pan-Chiao, Taipei Hsien (TW)

( * ) Notice: Subject to any disclaimer, the term of this patent is extended or adjusted under 35 U.S.C. 154(b) by 290 days.

(21) Appl. No.: 10/906,803

(22) Filed: Mar. 8, 2005

(65) Prior Publication Data

US 2006/0098083 A1 May 11, 2006

(30) Foreign Application Priority Data

Nov. 10, 2004 (TW) .............................. 93134296 A

(51) Int. Cl.
*G01D 15/10* (2006.01)
*B41J 35/36* (2006.01)
*B41J 33/10* (2006.01)

(52) U.S. Cl. ...................... 347/220; 400/225; 400/234; 400/249; 400/703; 400/711; 347/219

(58) Field of Classification Search ............ 400/248.3, 400/249
See application file for complete search history.

(56) References Cited

U.S. PATENT DOCUMENTS 2,365,254 A * 12/1944 Dolan ......................... 400/54
4,037,535 A * 7/1977 Lehmann et al. ........... 101/287
4,174,078 A * 11/1979 Brooks .................... 242/421.8
4,406,554 A * 9/1983 Dreinhoff et al. ........... 400/249
4,790,677 A * 12/1988 Kress ......................... 400/249
4,793,723 A * 12/1988 Furhata ...................... 400/249
5,433,539 A * 7/1995 German ...................... 400/225
5,480,238 A * 1/1996 Nakano et al. ........ 400/120.04
5,873,662 A * 2/1999 Clevinger .................. 400/234
5,993,092 A * 11/1999 Palmer ....................... 400/234
7,071,961 B2 * 7/2006 Ullenius et al. ............ 347/219
2004/0057768 A1 * 3/2004 Oshino et al. ............. 400/103

OTHER PUBLICATIONS

Yuio Tokunaga and Kiyoshi Sugiyama, Thermal Ink-Transfer Imaging, Jan. 01, 1980, IEEE Transactions on Electron Devices, vol. ED-27 No. 1, pp. 218-222.*

* cited by examiner

*Primary Examiner*—Matthew Luu
*Assistant Examiner*—John P Zimmermann
(74) *Attorney, Agent, or Firm*—Winston Hsu

(57) ABSTRACT

A printer includes a ribbon supply end, a ribbon retrieving end, and a ribbon. The two ends of the ribbon are installed on the ribbon supply end and the ribbon retrieving end respectively. The printer further includes a print head, a print medium fixture, a driving module for driving the ribbon from the ribbon supply end to the ribbon retrieving end, a moving shaft for moving from a first position of the ribbon between the print head and the ribbon supply end so as to elongate the ribbon between the print head and the ribbon supply end before the print head transfers dye on the ribbon onto the print medium and when the print head and the print medium fixture clamp the print medium, and a control module for controlling the printer according to whether the moving shaft can be moved from the first position to a second position.

11 Claims, 5 Drawing Sheets

PRINTER CAPABLE OF DETECTING STATUS OF UNUTILIZED RIBBON

BACKGROUND OF THE INVENTION

1. Field of the Invention

The present invention relates to a printer capable of detecting the status of unutilized ribbon, more particularly, to a printer capable of elongating the ribbon between a print head and a ribbon supply end to detect the status of the unutilized ribbon.

2. Description of the Prior Art

A printer has become an essential output device in our information age. A traditional printer prints data onto a piece of paper or a print medium. As information technology advances, printers nowadays come with a variety of functions. For example, a thermal printer is capable of printing an image directly from a digital camera onto a piece of paper, the advantage is that a user can choose to print a favorite image or photograph and discard the rest. Therefore wasting resources and money to develop a full roll of traditional negatives to print photographs is avoided. The current thermal printer, utilizes a thermal print head to print documents, includes a paper drawer for placing print material such as paper, and an imaging material cassette for placing imaging material such as ink film or ribbon.

The thermal and ink jet printers have very similar frameworks, however, one difference being that the ink jet printer requires liquid ink whereas the thermal printer utilizes a solid ribbon. Another difference is that most ink jet printers utilize a half tone printing method; they are unable to print continuous tone of a real life photograph. Hence, the thermal printer that has a continuous tone function is becoming more popular among consumers. The thermal printer utilizes a sublimation technique to apply colors of the transfer ribbon directly onto the paper; the ribbon is a transparent cellular paper that includes dye. During the process of printing, the thermal print head heats the ribbon's dye. The melted color will be transferred from the ribbon onto the paper. Later when the color on the paper cools a colored image will be displayed.

In general, to ensure that there is sufficient ribbon for the next printout, there is a need to detect if the ribbon is reaching its end. In determining a conventional group of ribbon, a special barcode is added to the ribbon for the optical sensor to differentiate. Please refer to FIG. 1. FIG. 1 illustrates a perspective view of a ribbon apparatus of a conventional color printer 10. As shown in FIG. 1, the ribbon apparatus of the color printer 10 comprises a ribbon 12, two light sources 14, 16, and two sensors 18, 20. The ribbon 12 comprises a plurality of sequentially arranged dye regions 22. Each dye region 22 comprises four different color dye areas 24, 26, 28, 30 for placing yellow dye, magenta dye, cyan dye, and overcoating dye. An opaque dividing section 32 is located before a yellow dye area 24. A semi-opaque dividing section 34 and a transparent dividing section 36 are located between the dye areas 24 and 26, 26 and 28, 28 and 30. The light sources 14, 16 are located on one side of the ribbon 12 and produce light beams 38, 40 of two predetermined colors. The sensors 18, 20, corresponding to the light sources 14, 16, are located on the opposite side of the ribbon 12. The sensors 18, 20 are utilized to detect light beams 38, 40 penetrating through the ribbon 12 and produce corresponding signals to determine the position of the ribbon 12. The detection of an opaque dividing section 32 signals the beginning position of a new dye region 22 of the ribbon 12, and also corresponds to the beginning position of a yellow dye area 24. The detection of a semi-opaque dividing section 34 and a transparent dividing section 36 by the sensors 18, 20 corresponds to the beginning position of the magenta dye area 26, cyan dye area 28, or overcoating dye area 30. In the above-mentioned, a special barcode is added to the opaque dividing section 32 before a group of dye area 22 on the ribbon 12. The detection of the special barcode signals a last unused dye area 22 and to remind the user to replace the existing ribbon 12. In this method of detecting ribbon, the special barcode is needed to place in between each dye area, and it decreases the effective utilization of the ribbon 12, resulting in higher production costs of the ribbon 12.

SUMMARY OF INVENTION

The claimed invention relates to a printer capable of elongating the ribbon between a print head and a ribbon supply end to detect the status of unutilized ribbon and to solve the problem mentioned above.

One embodiment of the claimed invention is a printer capable of detecting the status of unutilized ribbon, the printer comprising: a ribbon supply end; a ribbon retrieving end; a ribbon wherein two ends of the ribbon are installed on the ribbon supply end and the ribbon retrieving end respectively; a print head for printing dye on the ribbon onto print medium; a print medium fixture installed on the side of the print head; a driving module for driving the ribbon supply end and the ribbon retrieving end, and to move the ribbon from the ribbon supply end to the ribbon retrieving end; a moving shaft for moving from a first position of the ribbon between the print head and the ribbon supply end so as to elongate the ribbon between the print head and the ribbon supply end before the print head transfers the dye on the ribbon onto the print medium and when the print head and the print medium fixture clamp the print medium; a control module for controlling the printer according to whether the moving shaft can be moved from the first position to a second position.

Another embodiment of the claimed invention is a method of controlling a printer, the method comprising the following steps: providing a moving shaft and a print medium fixture; controlling the moving shaft to move from a first position to a ribbon between a print head and a ribbon supply end of the printer so as to elongate the ribbon between the print head and the ribbon supply end of the printer before the print head of the printer prints dye on the ribbon onto the print medium and when the print head and the print medium fixture clamp the print medium; and controlling the printer according to whether the moving shaft can move from the first position to a second position.

These and other objectives of the present invention will no doubt become obvious to those of ordinary skill in the art after reading the following detailed description of the preferred embodiment that is illustrated in the various figures and drawings.

SUMMARY OF INVENTION

DETAILED DESCRIPTION

Figure 1:
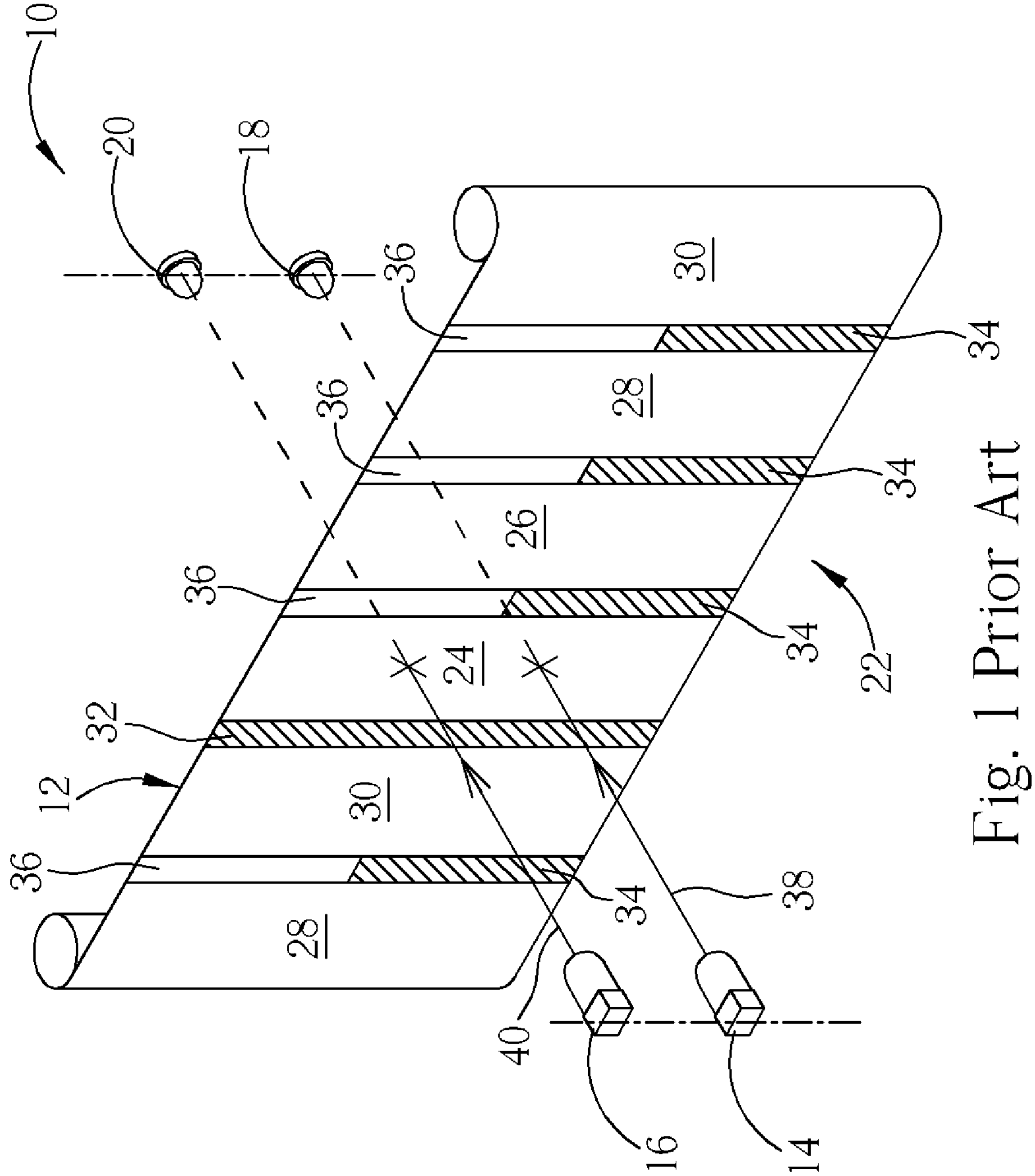
Fig. 1 Prior Art
FIG. 1 is a perspective view of a ribbon apparatus of a conventional color printer.
Figure 2:
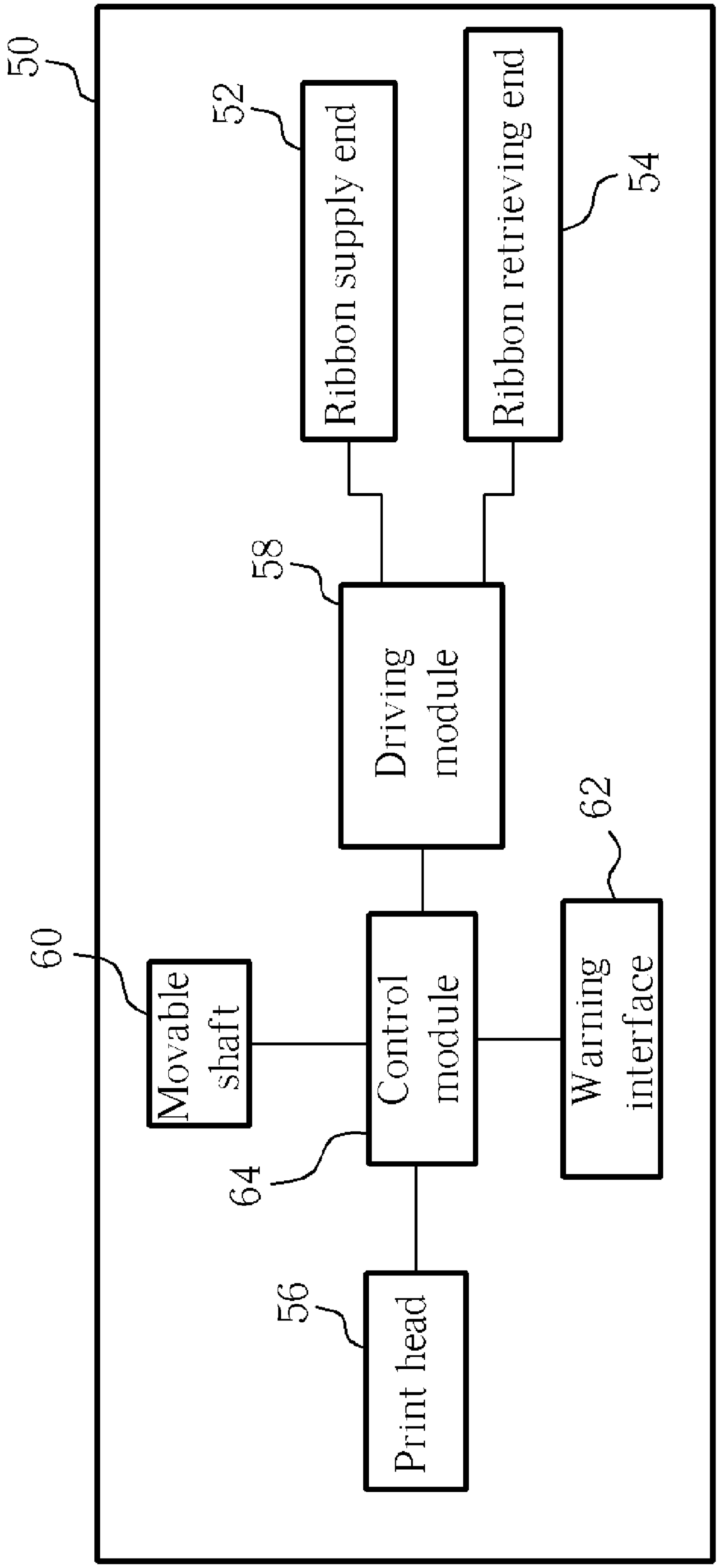
FIG. 2 illustrates a functional diagram of a printer capable of detecting the status of unutilized ribbon.

Please refer to FIG. 2. FIG. 2 illustrates a functional diagram of a printer 50 capable of detecting status of unutilized ribbon. The printer 50 can be a thermal printer. The printer 50 comprises a ribbon supply end 52 which can be a roller; a ribbon retrieving end 54 which can also be a roller; and a ribbon of the printer 50 wherein two ends of the ribbon are installed on the ribbon supply end 52 and the ribbon retrieving end 54 respectively; a print head 56 for printing dye on the ribbon onto print medium; a driving module 58 for driving the ribbon supply end 52 and the ribbon retrieving end 54, and to move the ribbon from the ribbon supply end 52 to the ribbon retrieving end 54; a moving shaft 60, which can be a roller, for elongating the ribbon between the print head 56 and the ribbon supply end 52; a warning interface 62 for displaying a warning signal which can be a warning light or a warning beeper; and a control module 64 for controlling the warning interface 62 to display a warning signal when the moving shaft cannot move from the first position to the second position according to whether the moving shaft 60 can be moved from a first position to a second position to control the printer 50.

Figure 3:
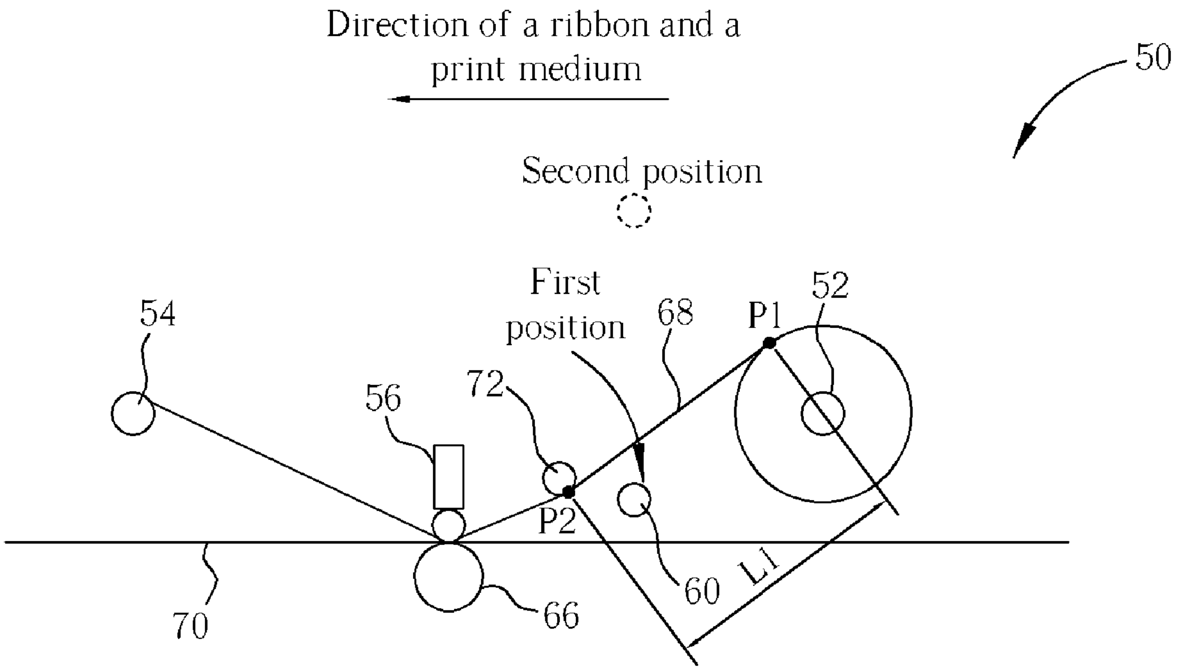
FIG. 3 illustrates an internal architectural diagram of a printer.

Please refer to FIG. 3. FIG. 3 illustrates an internal architectural diagram of the printer 50. The printer 50 further comprises a print medium fixture 66, which can be a roller such as a platen roller, located on the side of the print head 56, for clamping onto a ribbon 68 and a print medium 70 together with the print head 56 before performing a printout; a fixed roller 72, located between the print head 56 and the moving shaft 60, for clamping onto the ribbon in between the print head and the ribbon supply end 52 when the moving shaft 60 is moving along the ribbon between the print head 56 and the ribbon supply end 52 and elongating the ribbon. The ribbon 68 and the print medium 70 move according to the direction pointed in the diagram. The ribbon 68 is capable of moving from the ribbon supply end 52 to the ribbon retrieving end 54, the ribbon of the ribbon supply end 52 will become less and the ribbon of the ribbon retrieving end 54 will become more which means that thickness of the ribbon on the ribbon supply end 52 will become thinner and the thickness of the ribbon on the ribbon retrieving end 54 will become thicker. When the moving shaft 60 is fixed at a first location (starting position when the moving shaft 60 performs a movement), the ribbon length L1 is from an end P1 that touches above the ribbon of the ribbon supply end 52 to and an end P2 of the fixed roller 72 and the ribbon 68.

Figure 4:
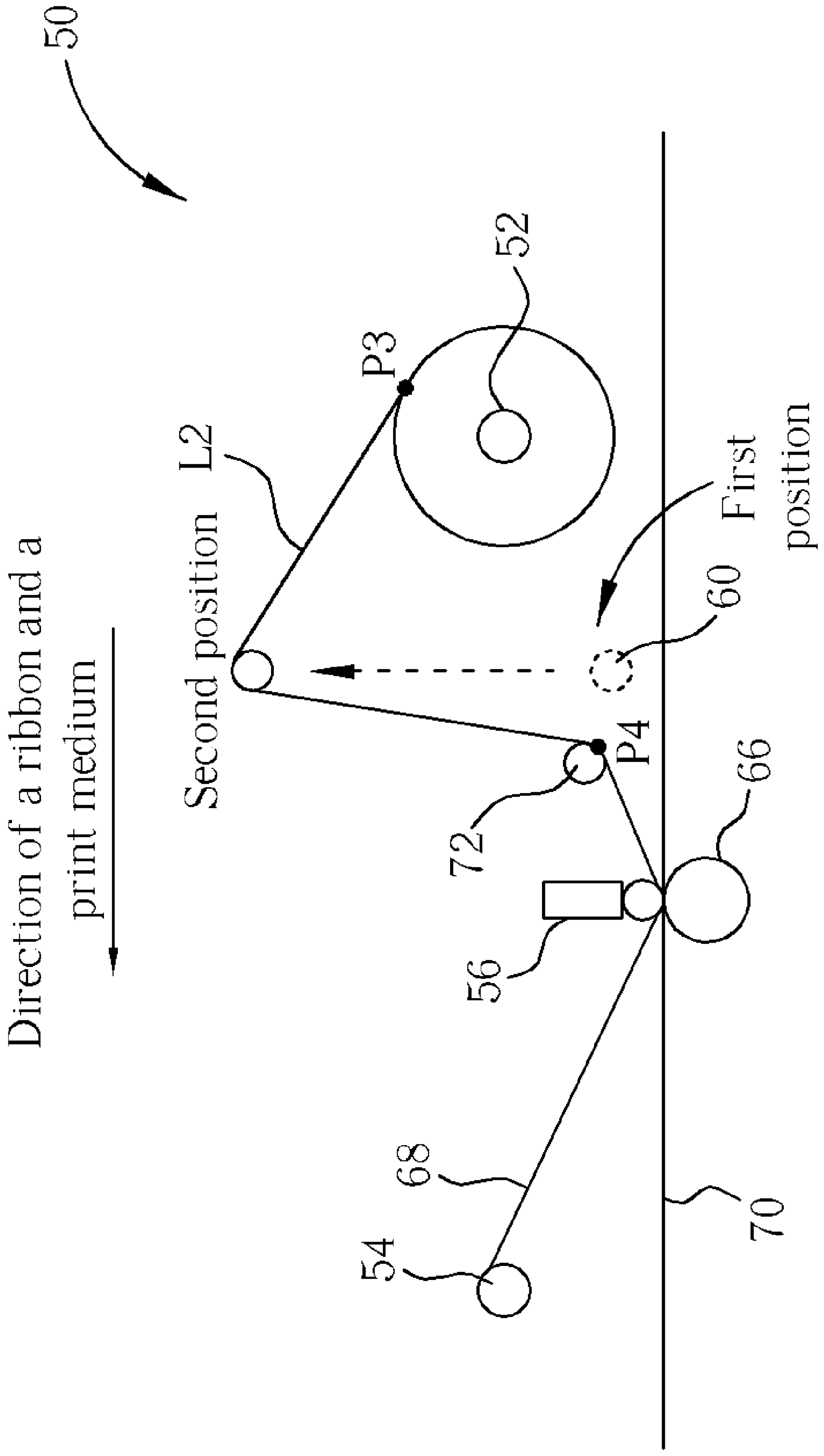
FIG. 4 illustrates an internal architectural diagram of a printer with sufficient ribbon.

Please refer to FIG. 4. FIG. 4 illustrates an internal architectural diagram of the printer 50 with sufficient ribbon. When executing each printout, before the print head 56 prints the dye on the ribbon 68 onto the print medium 70, the print medium fixture 66 and the print head 56 will clamp onto the ribbon 68 and the print media 70 together to prevent the print medium from slipping. Furthermore, the moving shaft 60 as shown in FIG. 4 moves the ribbon between the print head 56 and the ribbon supply end 52 from the first position to a second position for elongating the ribbon between the print head and the ribbon supply end, which means that the ribbon on the ribbon supply end 52 will be rolled out to provide an additional length of ribbon between the print head 56 and the ribbon supply end 52. If the moving shaft 60 is capable of moving to the second position, and the ribbon above on the ribbon supply end 52 moves from an end P3 to an end P4 of the fixed roller 72 and the ribbon 68, the ribbon length is known as L2. If the moving shaft 60 is capable of moving from the first position to the second position then the ribbon between the fixed roller 72 and the ribbon supply end 52 can be elongated from L1 to L2. In the arrangement of the first position and the second position, difference of the length of L2 and the length of L1 can be the length of a ribbon for a printout, or the length of ribbons for a predetermined number of printouts. When the moving shaft successfully moves from the first position to the second position, it represents that the corresponding ribbon supply end 52 is capable of providing the length of ribbon for a printout or a predetermined number of printouts. If the printer 50 is able to perform a next printout, the control module 62 will control the moving shaft 60 to return from the second position back to the first position and also the control module will control the ribbon supply end 52 to roll the additional length of ribbon (L2-L1) between the fixed roller 72 and the ribbon supply end 52 back, and returns to the status of FIG. 3. The control module then controls the driving module 58 to move the ribbon supply end 52 and the ribbon retrieving end 54, and to move the ribbon 68 from the ribbon supply end 52 to the ribbon retrieving end 54, lastly the control module controls the print head 56 to print the dye on the ribbon 68 onto the print medium 70, hence a printout is completed.

Figure 5:
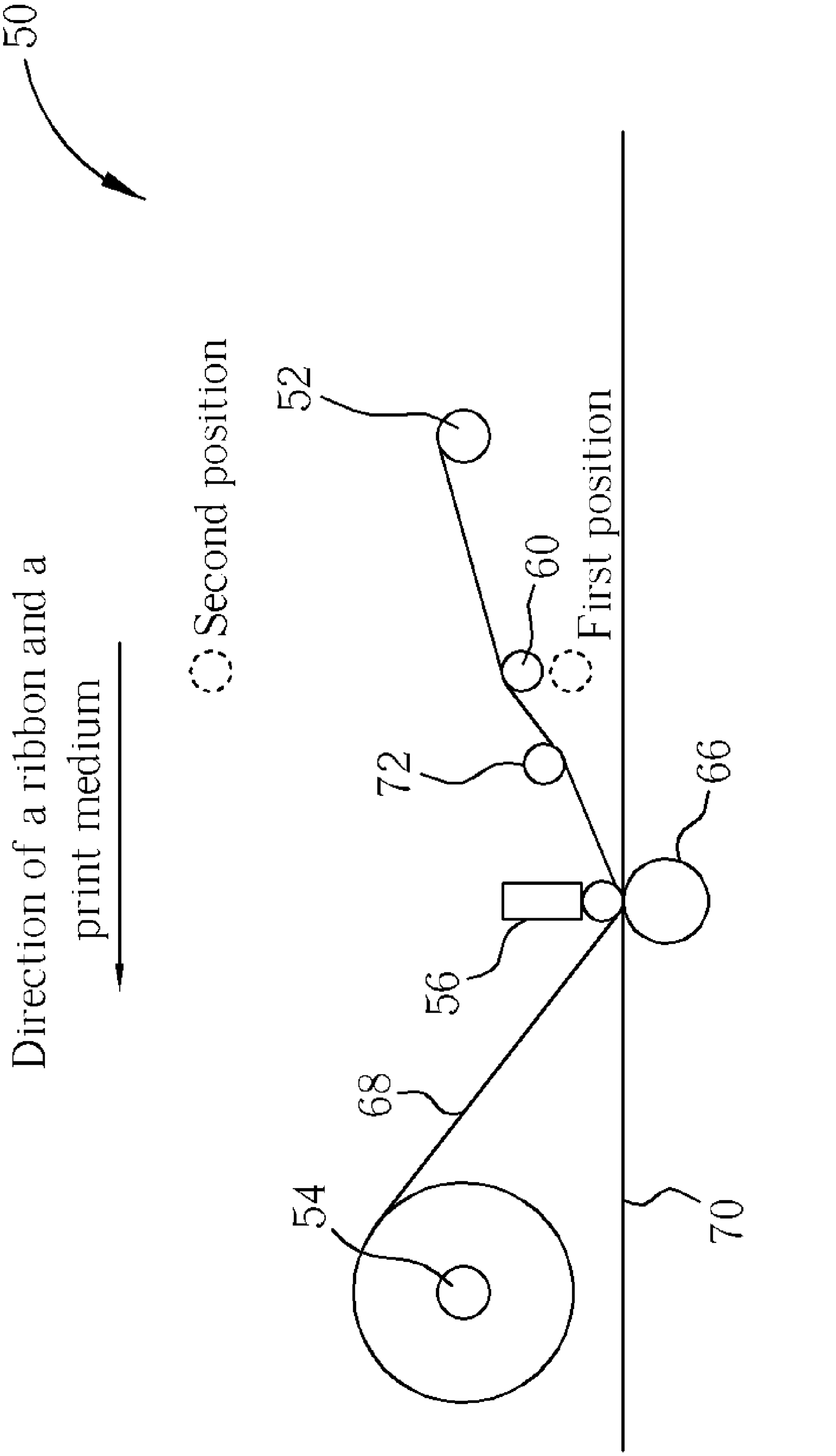
FIG. 5 illustrates an internal architectural diagram of a printer with insufficient ribbon.

Please refer to FIG. 5. FIG. 5 illustrates an internal architectural diagram of the printer 50 with insufficient ribbon. When executing each printout, before the print head 56 prints the dye on the ribbon 68 onto the print medium 70, the print medium fixture 66 and the print head 56 will clamp onto the ribbon 68 and the print media 70 together to prevent the print medium from slipping. Furthermore, the moving shaft 60 as shown in FIG. 5 moves the ribbon between the print head 56 and the ribbon supply end 52 from the first position to a second position, but as the ribbon on the ribbon supply end 52 cannot provide an additional length of ribbon (L2-L1) between the print head 56 and the ribbon supply end 52, the moving shaft then cannot move from the first position to the second position. In the arrangement of the first position and the second position, the difference of the length of L2 and the length of L1 can be the length of a ribbon for a printout, or the length of ribbons for a predetermined number of printouts. Therefore when the moving shaft is unable to move from the first position to the second position, it represents that the corresponding ribbon supply end 52 cannot provide the length of ribbon for a printout or a predetermined number of printouts. If the printer 50 cannot perform a next printout, the control module 62 will not control the driving module 58 to move the ribbon supply end 52 and the ribbon retrieving end 54, and the control module will not control the print head 56 to print the dye on the ribbon 68 onto the print medium 70, hence a printout is discontinued. Also the control module 66 will control the warning interface 62 to display a warning signal to advice the user that there is insufficient ribbon to proceed with the next printout and to replace the existing ribbon. In this way, the printer 50 will not perform a next printout when there is insufficient ribbon therefore a printing error can be avoided.

Furthermore, the moving shaft 60 can replace the tension arm which is capable of elongating the ribbon between the fixed roller 72 and the ribbon supply end 52, and before executing each printout, the ribbon between the fixed roller 72 and the ribbon supply end 52 is first elongated, to ensure that the ribbon on the ribbon supply end 52 is capable of providing the length of ribbon for a printout also in order for the control module 64 to proceed with the next step in the procedure of a printout.

In comparison with the prior art, the printer utilizes the elongated ribbon between the print head and the ribbon supply end to detect unutilized ribbon and to advise the user to replace the ribbon because there is insufficient ribbon to proceed with the next printout. In this way, the printer will not perform a next printout when there is insufficient ribbon therefore a printing error can be avoided. The present invention overcomes the defect of the special barcode when the ribbon reaches a predetermined group number and has to stay within each dye area to be detected according to the prior art, hence the present invention increases the effective utilization of the ribbon, resulting in lower production costs of the ribbon.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A printer capable of detecting status of unutilized ribbon, the printer comprising:

a ribbon supply end;

a ribbon retrieving end;

a ribbon wherein two ends of the ribbon are installed on the ribbon supply end and the ribbon retrieving end respectively;

a print head for printing dye on the ribbon onto print medium;

a print medium fixture installed on the side of the print head;

a driving module for driving the ribbon supply end and the ribbon retrieving end, and to move the ribbon from the ribbon supply end to the ribbon retrieving end;

a moving shaft for moving from a first position of the ribbon between the print head and the ribbon supply end so as to elongate the ribbon between the print head and the ribbon supply end before the print head transfers the dye on the ribbon onto the print medium and when the print head and the print medium fixture clamp the print medium; and a control module for controlling the printer according to whether the moving shaft can be moved from the first position to a second position, wherein when the moving shaft reaches the second position, the control module controls the moving shaft to return to the first position and then controls the print head to print dye on the ribbon onto the print medium.

2. The printer of claim 1 wherein the control module controls the print head not to print the dye on the ribbon onto the print medium when the moving shaft cannot move from the first position to the second position.

3. The printer of claim 1 further comprising:

a warning interface coupled to the control module wherein the control module controls the warning interface to display a warning signal when the moving shaft cannot move from the first position to the second position.

4. The printer of claim 3 wherein the warning interface is a warning light.

5. The printer of claim 1 further comprising:

a fixed roller installed between the print head and the moving shaft.

6. The printer of claim 1 wherein the moving shaft is a roller.

7. The printer of claim 1 wherein the print medium fixture is a roller.

8. The printer of claim 1 wherein the printer is a thermal printer.

9. A method of controlling a printer, the method comprising the following steps:

(a) providing a moving shaft and a print medium fixture;

(b) controlling the moving shaft to move from a first position of a ribbon between a print head and a ribbon supply end of the printer so as to elongate the ribbon between the print head and the ribbon supply end of the printer before the print head of the printer prints dye on the ribbon onto the print medium and when the print head and the print medium fixture clamp the print medium; and (c) controlling the printer according to whether the moving shaft can move from the first position to a second position, wherein when the moving shaft reaches the second position, the moving shaft is controlled to return to the first position and then the print head is controlled to print dye on the ribbon onto the print medium.

10. The method of claim 9 wherein step (c) controls the print head not to print the dye on the ribbon onto the print medium when the moving shaft cannot move from the first position to the second position.

11. The method of claim 9 wherein step (c) comprises controlling the printer to display a warning signal when the moving shaft cannot move from the first position to the second position.

* * * * *